US006241268B1

(12) United States Patent
Niklasson

(10) Patent No.: US 6,241,268 B1
(45) Date of Patent: Jun. 5, 2001

(54) WHEELCHAIR FRICTION DRIVE RING

(76) Inventor: Karl-Olof Niklasson, Lycke 3785, S-453 91, Lysekil (SE)

( * ) Notice: Subject to any disclaimer, the term of this patent is extended or adjusted under 35 U.S.C. 154(b) by 0 days.

(21) Appl. No.: 09/263,710

(22) Filed: Mar. 5, 1999

(30) Foreign Application Priority Data

Sep. 16, 1998 (SE) ........................ 9803137
Oct. 16, 1998 (SE) ........................ 9803561

(51) Int. Cl.[7] ........................ B62M 1/14
(52) U.S. Cl. ........................ 280/250.1; 280/304.1
(58) Field of Search ........................ 280/250.1, 650, 280/304.1, 242.1, 249; 297/DIG. 4; 74/552, 558

(56) References Cited

U.S. PATENT DOCUMENTS 4,366,964 * 1/1983 Farey et al. ........................ 280/250.1
4,593,929 * 8/1987 Williams ........................ 280/650
4,687,218 * 8/1987 Okamoto ........................ 280/250.1
4,917,395 * 4/1990 Gabriele ........................ 280/250
5,160,156 * 11/1992 Mendon ........................ 280/250.1
5,927,739 * 9/1999 Evling ........................ 280/250.1

FOREIGN PATENT DOCUMENTS

1105764 * 12/1955 (FR) ........................ 280/250.1

* cited by examiner

*Primary Examiner*—Daniel G. DePumpo
(74) *Attorney, Agent, or Firm*—Orum & Roth

(57) ABSTRACT

The invention relates to an arrangement (1) for a wheelchair drive ring (2) that is separate from the wheel of the wheelchair and exhibits a drive-actuating surface (5) facing in a direction outwards from the wheelchair wheel. In accordance with the invention, an upper concave drive-actuating surface (6) of the drive ring (2), which can be attached separately to the rim of the wheelchair wheel, is transformed directly into a lower convex drive-actuating surface. The aforementioned lower convex drive-actuating surface (7) is transformed into a circular gripping part (9) on the underside of the outward-facing drive-actuating surface (5). The aforementioned upper concave drive-actuating surface (6) and the gripping part are transformed jointly into a downward-angled finger guard extending in towards the center of the wheel. Friction-increasing gripping material (100) is provided only on the upper concave drive-actuating surface (6) of the drive ring (2).

15 Claims, 5 Drawing Sheets

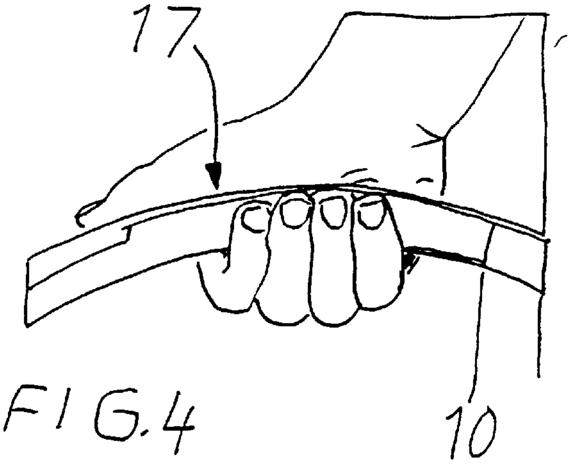
FIG. 4
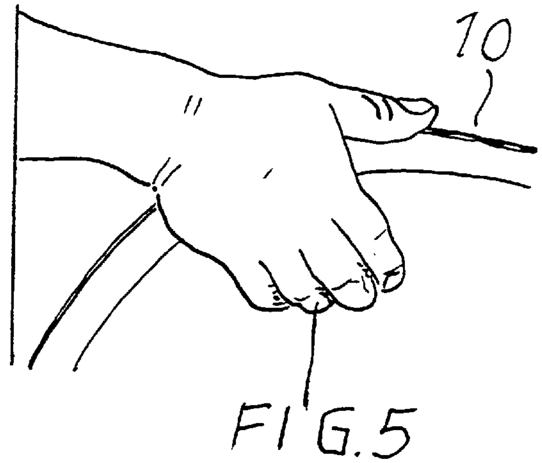
FIG. 5
FIG. 6
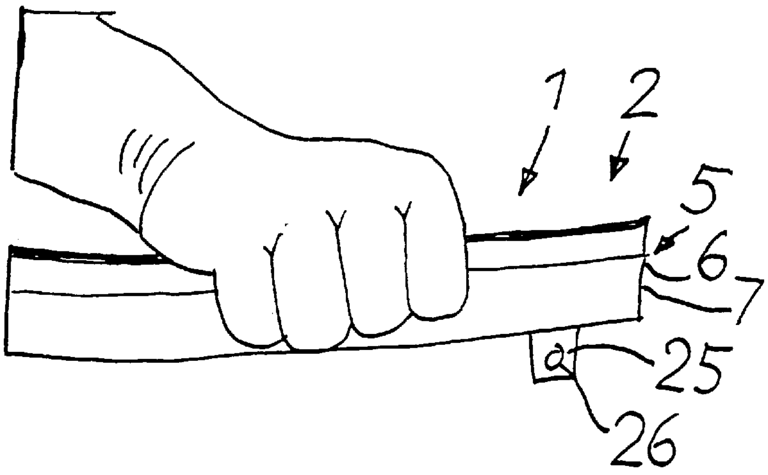
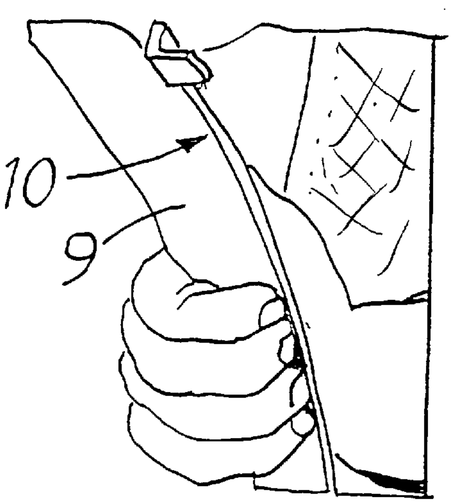
FIG. 7

WHEELCHAIR FRICTION DRIVE RING

The present invention relates to an arrangement for a wheelchair drive ring that is separate from the wheel of the wheelchair and exhibits a drive-actuating surface facing in a direction outwards from the wheelchair wheel.

In order to obtain maximum grip with the hand on the drive ring, the form of the actuating surface of the drive ring and its supporting frame have been varied. GB 2,122,144 A shows a drive ring with pairs of convex drive-actuating surfaces with a straight interconnecting gripping surface between them. This form is not so good, however, because the hand does not find the correct grip and is exposed at all times to the risk of sliding off the drive ring. Furthermore, no protection is provided from the spokes on the wheel. U.S. Pat. No. 4,366,964 also shows a drive ring of a similar kind with the same disadvantages.

The drive ring in this case is also executed so that it is completely smooth or with a friction-increasing gripping material along its entire effective gripping surface. This presents disadvantages, in the sense that it is not easy to vary the desired gripping interaction or the appropriate braking surface without the risk of suffering burns.

The principal object of the present invention is thus, in the first instance, to solve the aforementioned problems by means of a wheelchair drive of the indicated kind.

The aforementioned object is achieved by means of an arrangement in accordance with the present invention, which is characterized essentially in that an upper concave drive-actuating surface of the drive ring, which can be attached separately to the rim of the wheelchair wheel, is transformed directly into a lower convex drive-actuating surface, in that the aforementioned lower convex drive-actuating surface is transformed into a circular gripping part on the underside of the outward-facing drive-actuating surface, in that the aforementioned upper concave drive-actuating surface and the gripping part are transformed jointly into a downward-angled finger guard extending in towards the centre of the wheel, and in that friction-increasing gripping material is provided only on the upper concave drive-actuating surface.

The invention is described below as a preferred illustrative embodiment with reference to the accompanying drawings, in which:

FIGS. 1–7 show different views of the gripping effect with a drive ring;

Figure 1:
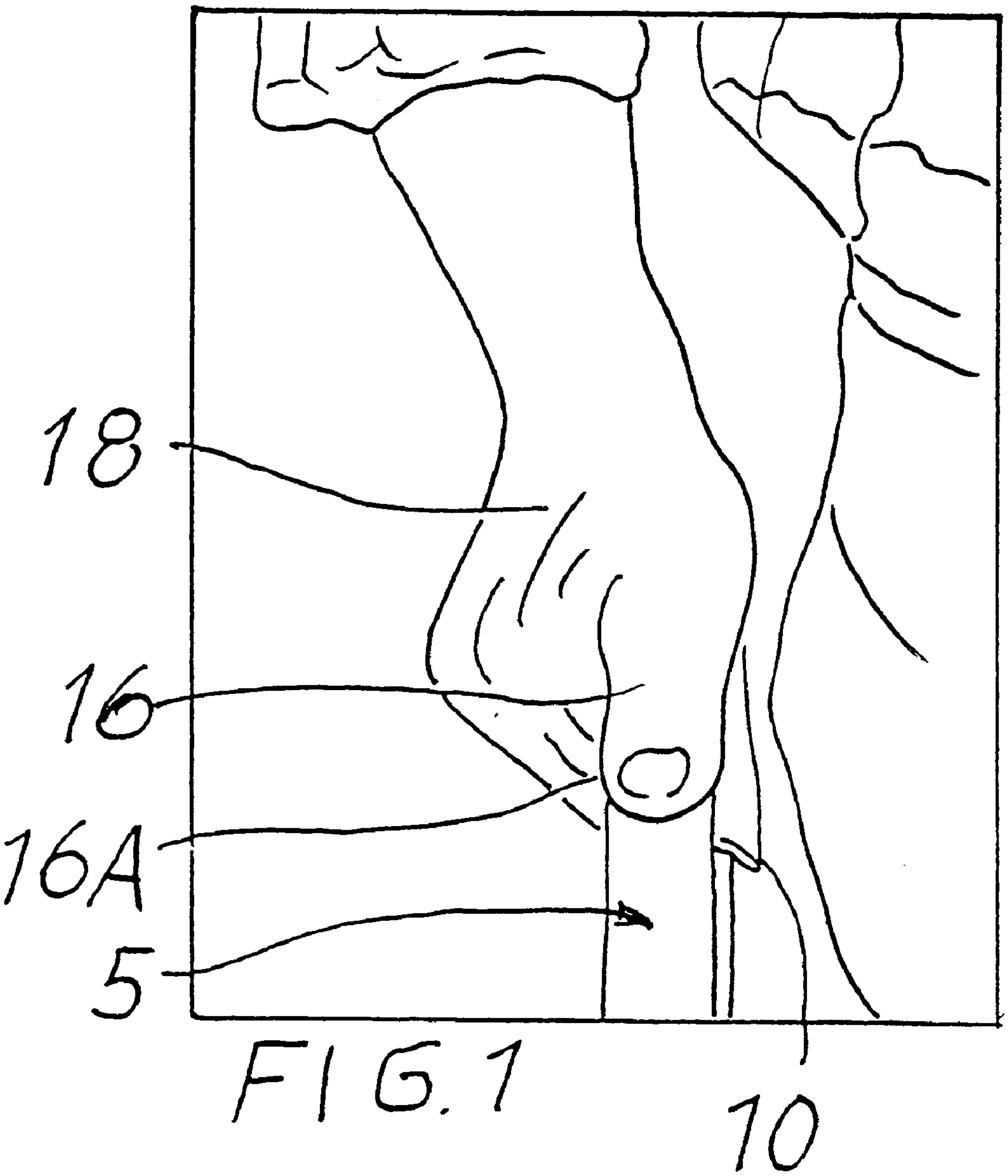
Figure 3:
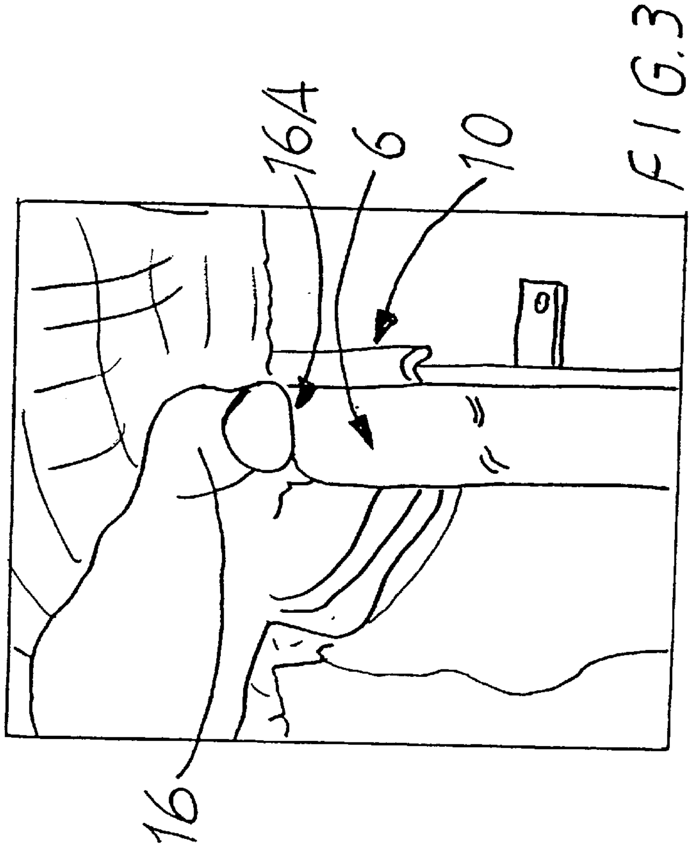
Figure 2:
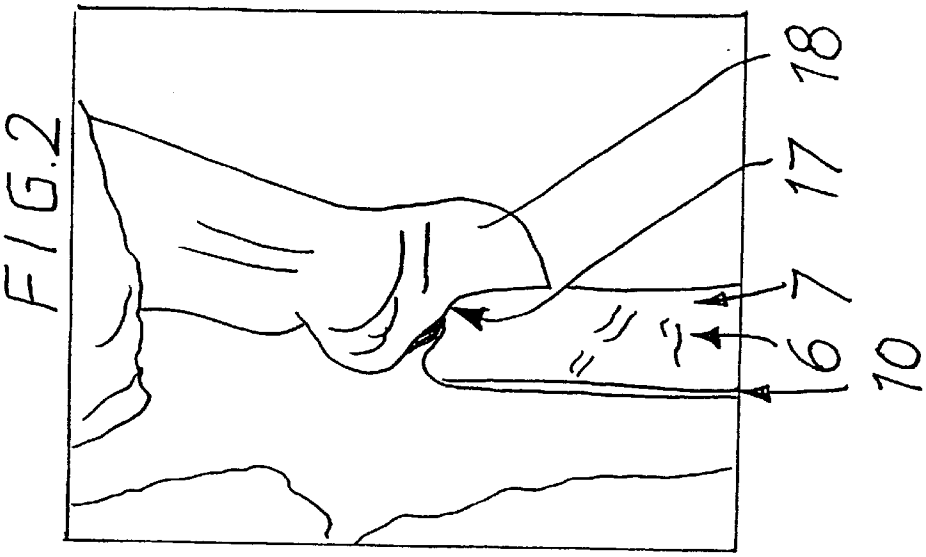
Figure 8:
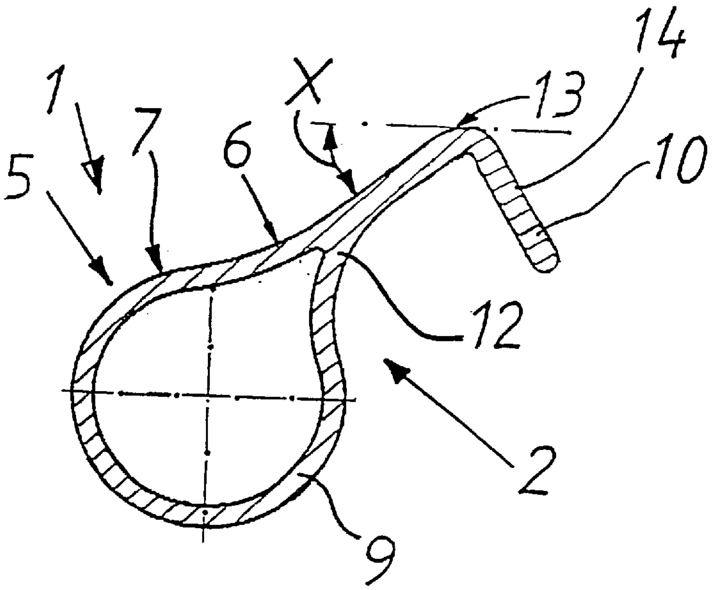
FIG. 8 shows a cross-section through a drive ring.

In an arrangement 1 for a wheelchair drive ring 2 for a wheelchair wheel 3, which exhibits a drive-actuating surface 5 facing in a direction 4 outwards from the wheelchair wheel 3 in accordance with the invention, the aforementioned drive-actuating surface 5 is formed by an upper concave drive-actuating surface 6, which is transformed directly into a lower convex drive-actuating surface 7 without any interjacent surfaces.

The aforementioned lower convex drive-actuating surface 7 is transformed in the opposite direction 8 into a circular gripping part 9, which is situated on the underside of the outward-facing drive-actuating surface 5.

The aforementioned upper concave drive-actuating surface 6 and gripping part 9 are transformed jointly into a downward-facing finger guard 10, which extends in towards the centre 11 of the wheel and is intended to prevent the fingers from getting into the spokes of the wheel.

The aforementioned drive ring 2 is formed by a hollow profile, which extends around and along the entire periphery of the wheel, and the aforementioned hollow profile is preferably tear-shaped.

The upper concave drive-actuating surface 6 is formed by the upper surface of the tapering cross-sectional part 12 of the hollow profile facing upwards at an angle.

The tapering, end part 12 of the aforementioned hollow profile facing upwards at an angle extends at an angle x of between 40° and 60° from a horizontal plane 13, preferably ca. 40°.

A finger guard 10 is formed by the prolongation 14 of the tapering end 12 of the hollow profile, which extends inwards at an angle towards the centre 11 of the wheel.

The aforementioned prolongation 14 of the tapering end 12 of the hollow profile preferably extends essentially at right angles to the end part 12 extending upwards 15 at an angle.

Figure 9:
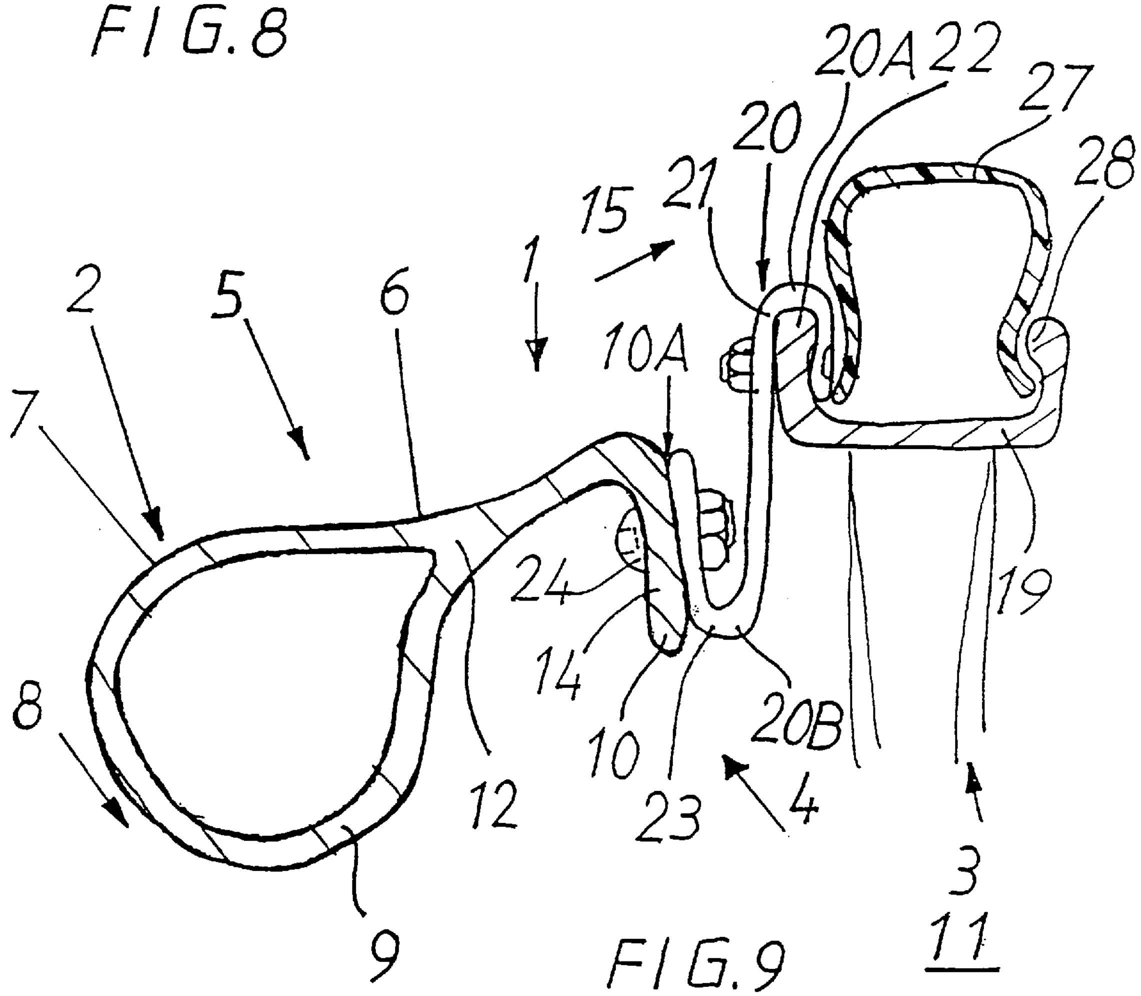
FIG. 9 shows the attachment of a drive ring to a wheelchair wheel in schematic form.

The drive-actuating surface 6, which is actuated with the underside 16A of the entire thumb 16 and the inside 17 of the hand 18, and the finger guard 10 extend around the entire periphery of the wheel. The aforementioned finger guard 10, like the rest of the drive ring 2, is capable of attachment to the frame of the wheel, i.e. the rim 19 preferably with attachments 20 in the form of loose and appropriately Z-shaped angle pieces by which the drive ring 2 is attached to the rim 19 of the wheel, for example as shown in FIG. 9. The drive ring 2 and the rim 19 of the wheel are thus separate parts that are separate from one another, but capable of attachment to one another.

The outer end 20A of each attachment 20 is bent back on itself 21 for this purpose so as to enclose one edge 22 of the rim and to be securely clamped to the wheel 3 by the tire 27, and so as to be capable of further attachment by riveting or screwing to the rim. The opposite inner end 20B of the attachment 20 is also bent back on itself 23 so that it is able to make contact with the upper side 10A of the finger guard 10 and to be riveted in place or securely fixed to it with a screw 24.

When the tire 27 is inflated with air, the tire presses against the attachment 20, 21 and secures it additionally, preferably against a thickened part 28 on the wheel rim.

Attachment tongues 25 are shown in the drawings with holes 26 on the drive ring 2, to which the attachment 20 can be connected as an alternative.

Figure 10:
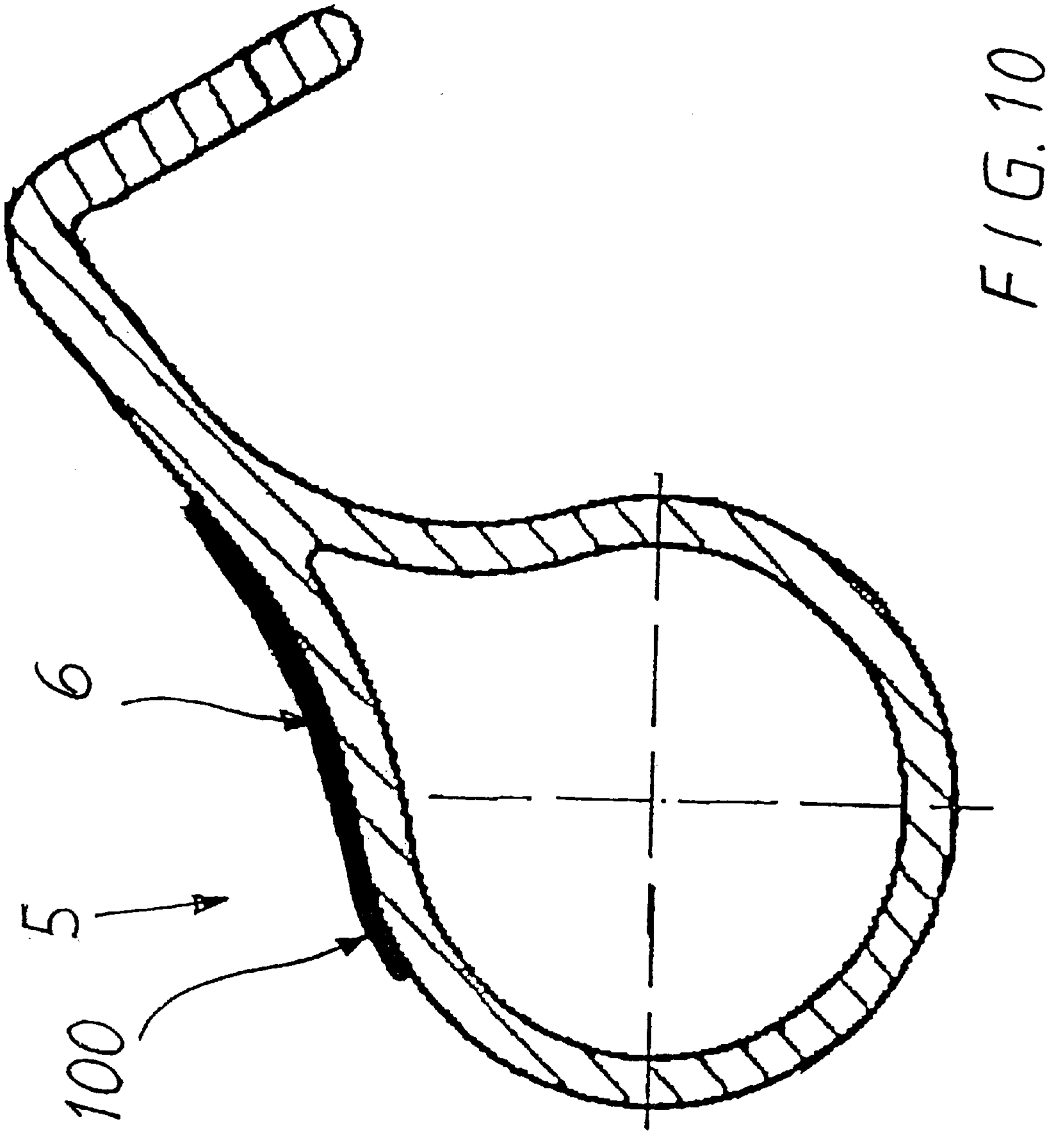
FIG. 10 shows a further cross-section of the drive ring.

It can be appreciated from FIG. 10 that a friction-increasing material 100 or some other means to increase the friction is arranged only on the upper concave drive-actuating surface 6 of the drive ring 2, while the rest of the drive ring 2 is smooth to permit the application of the hand against it for braking purposes without the person sitting in the wheelchair being exposed to the risk of suffering burns in the event of excessively heavy braking. The aforementioned friction-increasing material 100 can be in the form of strips of rubber that are attached, for example, by gluing or vulcanizing to the drive ring 2.

The invention should have been appreciated from what is described above and shown in the drawings, but may be varied within the scope of the Patent Claims without departing from the idea of invention.

What is claimed is:

1. Arrangement of a wheelchair drive ring for a wheel of a wheelchair, wherein:

the wheelchair drive ring is separate from the wheel of the wheelchair and exhibits a drive-actuating surface facing in a direction outward from the wheelchair wheel, the wheelchair drive ring having means for attachment to a rim of the wheelchair wheel, with respect to a top dead center cross section, an upper concave drive-actuating surface of the wheelchair drive ring is transformed directly into a lower convex drive-actuating surface, which is transformed into a circular gripping part on the underside of the upper-facing drive-actuating surface, said upper concave drive-actuating surface and the gripping part of the wheelchair drive ring are transformed jointly into a downward angled finger guard, said finger guard extending in towards a center of the wheel, friction increasing gripping material is provided only on the upper concave drive-actuating surface, the wheelchair drive ring is formed by a hollow profile, which extends along a periphery of the wheelchair drive ring, the upper concave drive-actuating surface is formed by the upper surface of a tapering cross-sectional part of the hollow profile facing upward at an angle, the finger guard is formed by a prolongation of the tapering end of the hollow profile, and the drive-actuating surface and the finger guard extend around the periphery of the entire wheelchair drive ring.

2. Arrangement as claimed in Patent claim 1, wherein the hollow profile is tear-shaped.

3. Arrangement as claimed in claim 1, wherein the finger guard (10) extends inwards at an angle towards the centre (11) of the wheel.

4. Arrangement as claimed in claim 1 wherein the finger guard (10) is capable of attachment to a frame (19) of the wheel.

5. Arrangement as claimed in Patent claim 4, wherein attachments (20) in the form of angle pieces connect the wheelchair drive ring to the rim (19) of the wheel.

6. Arrangement as claimed in Patent claim 5, wherein the outer end of the attachment is bent back on itself (21) so as to enclose one edge (22) of the rim and to be securely clamped to it, and in that the inner end (20B) of the attachment (20) is also bent back on itself (23) so that it makes contact with an upper surface (10A) of the finger guard (10) and is connected to it.

7. Arrangement as claimed in Patent claim 1, wherein the friction-increasing material (100) is in the form of strips of rubber.

8. Arrangement as claimed in Patent claim 7, wherein the strips of rubber are attached by gluing to the drive ring (2).

9. Arrangement as claimed in Patent claim 7, wherein the strips of rubber are attached by vulcanizing to the drive ring (2).

10. Arrangement as claimed in claim 1, wherein the finger guard extends inwards at an angle towards the center of the wheel, at right angles to the upper concave drive-actuating surface.

11. Arrangement as claimed in claim 1, wherein the drive-actuating surface and the finger guard extend around the periphery of the entire wheel.

12. A arrangement as claimed in claim 1, wherein the finger guard is capable of attachment to a frame of the wheel.

13. Arrangement as claimed in claim 2, wherein drive-actuating surface and the finger guard extend around the periphery of the entire wheel.

14. Arrangement as claimed in claim 1, wherein the upper concave drive-actuating surface extends from the hollow profile at an angle of between 40° and 60° from a horizontal plane.

15. Arrangement of a wheelchair drive ring for a wheelchair wheel wherein:

said wheelchair drive ring having, with respect to a cross section at top dead center, an upper concave drive-actuating surface which is transformed directly into a lower convex drive-actuating surface, which is transformed into a circular gripping part, on the under side of the lower convex drive-actuating surface, having a hollow profile;

said upper concave drive-actuating surface and said circular gripping part are transformed jointly into a continuous, about a circumference of the wheelchair drive ring, downward angled finger guard, said finger guard extending in toward a center of the wheel;

friction increasing gripping material is provided only on the upper concave drive-actuating surface;

said wheelchair drive ring having attaching means for attachment to a rim of the wheelchair wheel.

* * * * *